(12) United States Patent
Sanchez et al.

(10) Patent No.: US 8,199,482 B2
(45) Date of Patent: Jun. 12, 2012

(54) PERIPHERAL DEVICE CARRYING APPARATUS AND SYSTEMS

(75) Inventors: Anthony Sanchez, Round Rock, TX (US); Stephen James Wotherspoon, Austin, TX (US); Steven J. Zielnicki, Round Rock, TX (US); David M. Ajo, Berkeley, CA (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 12/604,801

(22) Filed: Oct. 23, 2009

(65) Prior Publication Data

US 2011/0096490 A1  Apr. 28, 2011

(51) Int. Cl.
*G06F 1/16* (2006.01)
(52) U.S. Cl. ............. 361/679.38; 361/679.33; 361/726; 312/223.1; 312/223.2; 312/333
(58) Field of Classification Search .............. 361/679.38, 361/726
See application file for complete search history.

(56) References Cited

U.S. PATENT DOCUMENTS

| | | | |
|---|---|---|---|
| 2,609,268 A * | 9/1952 | Nye | 312/332.1 |
| 5,222,897 A * | 6/1993 | Collins et al. | 439/157 |
| 6,064,568 A | 5/2000 | Schmitt | |
| 6,381,139 B1 * | 4/2002 | Sun | 361/725 |
| 6,421,236 B1 * | 7/2002 | Montoya et al. | 361/679.58 |
| 6,918,174 B2 * | 7/2005 | Kim et al. | 29/603.04 |
| 7,203,067 B2 * | 4/2007 | Beall et al. | 361/726 |
| 7,321,489 B2 | 1/2008 | McAlister | |
| 7,583,497 B2 * | 9/2009 | Roesner | 361/679.33 |
| 2007/0274053 A1 * | 11/2007 | Salinas et al. | 361/726 |
| 2008/0013288 A1 * | 1/2008 | Karstens | 361/726 |

* cited by examiner

*Primary Examiner* — Anthony Q Edwards
(74) *Attorney, Agent, or Firm* — Garrana Tran LLP; Andrea E. Tran (57) ABSTRACT

A peripheral device assembly is disclosed wherein the assembly includes a device bay for receiving a peripheral device carrier. An interior side surface of the device bay defines at least one extrusion portion surrounding a hole for receiving a first end of a lever arm of the peripheral device carrier, and the extrusion portion comprises edges protruding from the interior side surface of the device bay toward an exterior side surface of the device bay.

17 Claims, 6 Drawing Sheets

PERIPHERAL DEVICE CARRYING APPARATUS AND SYSTEMS

TECHNICAL FIELD

The present disclosure relates generally to the field of information handling systems, and more specifically, systems and apparatus for carrying peripheral devices within information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (IHS) may include peripheral devices including storage devices (e.g., hard drives) that are coupled to the chassis or bay of the IHS. For example, a hard drive is typically disposed within a hard drive carrier, and the carrier may be inserted, via a guide rail system, into the drive bay of the chassis of the IHS or drive assembly. Thus, the hard drive carrier may accommodate a hard drive while also mechanically mating with a drive bay of an IHS.

The mechanical connection between the hard drive carrier and the drive bay may be affected by the manufacturing tolerances of the hard drive housed within the hard drive carrier, the chassis, and/or the drive bay, which is housed within the IHS. Particularly, in cases where more than one hard drive carrier is inserted into an IHS, space constraints may exist for camming the multiple carriers into the drive bay. Space constraints may be a result of a requirement that the cam surface, i.e., point of insertion, of the hard drive carrier be close to the front surface of the IHS (e.g., server) chassis, particularly the drive bay. In some situations, the distance between the edge of the cam surface of the hard drive carrier and the front of the drive bay can be limited, i.e., less than 3 mm. Further, the introduction of multiple hard drive carriers, each associated with relatively large insertion and retention force, may result in a need for a great amount of strength in the cam surface of the drive bay.

Previous and current IHS platforms employ bent tabs as cam surfaces between drive bays and drive carriers. However, the bent tabs have experienced difficulty in withstanding the insertion and retention force requirements of the hard drive carriers and tight tolerances pertaining to space requirements of the cam surfaces between the drive bays and drive carriers.

Thus, a need exists for improved peripheral device carrying apparatus and systems designed to withstand space and force requirements in a typical IHS.

SUMMARY

The following presents a general summary of several aspects of the disclosure in order to provide a basic understanding of at least some aspects of the disclosure. This summary is not an extensive overview of the disclosure nor is it intended to identify key or critical elements of the disclosure or to delineate the scope of the claims. The following summary merely presents some concepts of the disclosure in a general form as a prelude to the more detailed description that follows.

One aspect of the disclosure provides for a peripheral device assembly wherein the assembly includes a device bay for receiving a peripheral device carrier. An interior side surface of the device bay defines at least one extrusion portion surrounding a hole for receiving a first end of a lever arm of the peripheral device carrier, and the extrusion portion comprises edges protruding from an interior side surface of the device bay toward an exterior side surface of the device bay.

Another aspect of the present disclosure provides for a storage device assembly disposed within an information handling system, the assembly including a device bay for receiving a hard drive carrier, wherein an interior side surface of the device bay defines at least one extrusion portion surrounding a hole for receiving a first end of a lever arm of the hard drive carrier. The extrusion portion includes edges protruding from the interior side surface of the device bay toward an exterior side surface of the device bay.

A further aspect of the present disclosure provides for an information handling system including a processor, a memory communicatively coupled to the processor, and a chassis supporting the processor and the memory. The system further includes a device bay, coupled to the chassis, for receiving a peripheral device carrier, wherein a surface of the device bay defines at least one extrusion portion surrounding a hole for engaging with a first end of a lever arm of the hard drive carrier when the peripheral device carrier is in a locked position. The extrusion portion includes edges protruding from an interior side of the surface of the device bay toward an exterior side of the surface of the device bay.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus and systems are described, it is to be understood that this disclosure is not limited to the particular apparatus and systems described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a drive" refers to one or more drives, and reference to "a method of contacting" includes reference to equivalent steps and methods known to those skilled in the art, and so forth.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

The present disclosure describes external or peripheral devices which may be inserted into, placed in contact with, coupled to, and/or communicatively coupled to an IHS. Although the disclosure may mention specific types or components of peripheral devices such as storage devices, drive assemblies, drive bays, hard drive carriers, or the like, those skilled in the art will recognize that the aforementioned devices/components may be used interchangeably with peripheral device assemblies, peripheral device bays, peripheral device carriers, or the like. Examples of peripheral device may include, but are not limited to, storage devices, power supplies, or any suitable device/component which may be inserted into, placed in contact with, coupled to, and/or communicatively coupled to an IHS.

Figure 1:
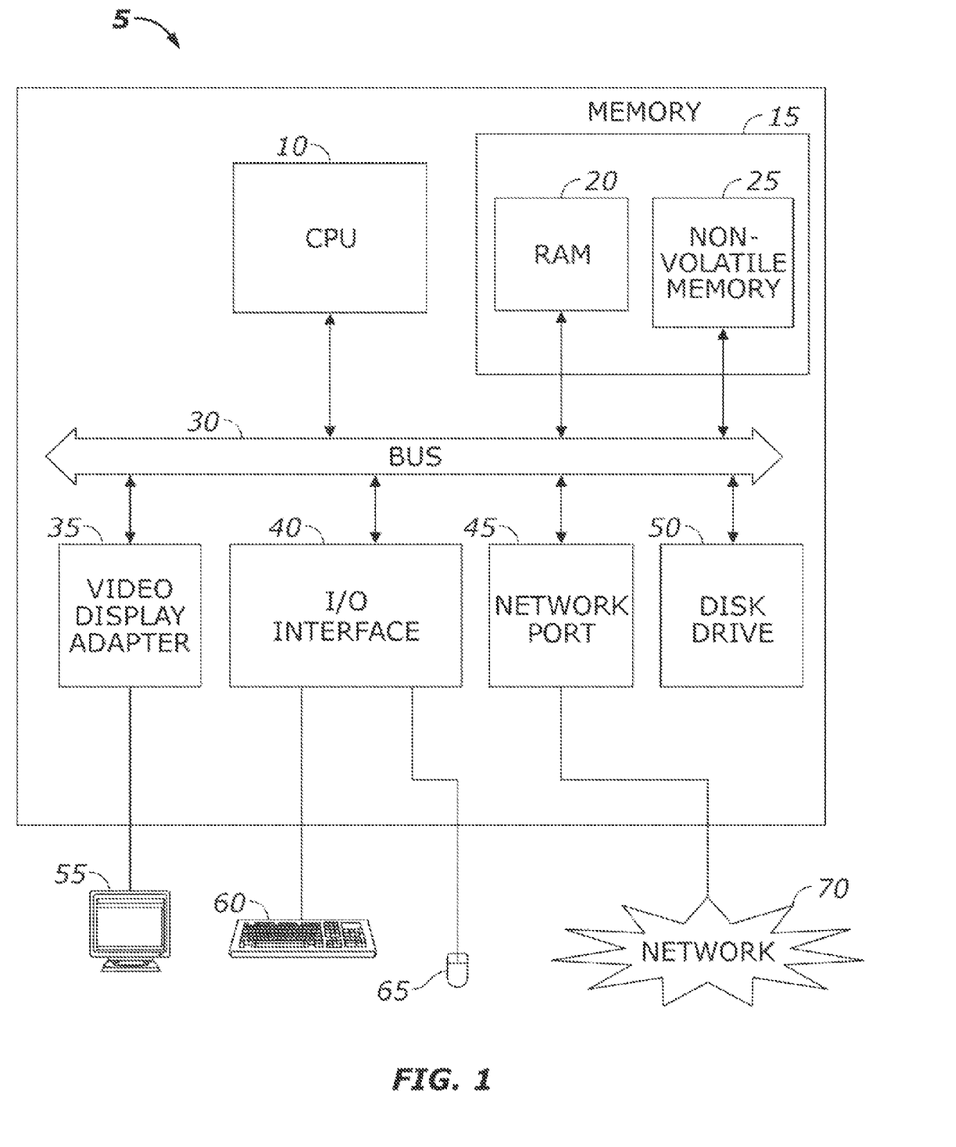
FIG. 1 represents an information handling system (IHS) in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65). Further, the aforementioned components may be housed within or supported by a chassis (not shown).

Figure 2:
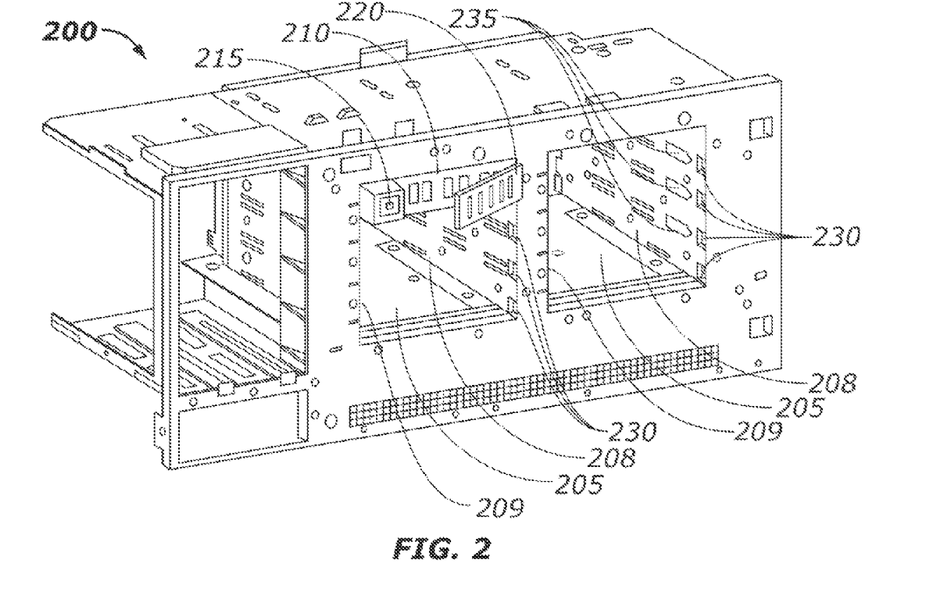
FIG. 2 provides a perspective view of a drive assembly mountable within an IHS, in accordance with one aspect of the present disclosure.

FIG. 2 depicts one example of a carrier for a storage device of an IHS, a drive assembly indicated generally at 200. The drive assembly 200 shown may be a component of an IHS such as a server system, a desktop computer system, a workstation, or a network storage device. The drive assembly 200 is merely one example of a peripheral device assembly contemplated herein. The drive assembly 200 may include at least one peripheral device bay, such as a drive bay 205, mounted within the drive assembly 200. Disposed within the drive assembly 200, particularly on an interior side surface 208, 209 of the drive bay 205, are guide rails 235 to receive a peripheral device carrier, shown as a hard drive carrier 210. At least one extrusion portion 230 disposed on the interior side surface 208 of the drive bay 205 provides a point for the insertion (i.e., camming or cam surface) for the hard drive carrier 210 into the drive assembly (to be discussed in more detail below). Generally, components of a drive assembly 200 may be constructed from any suitable material such as metal or metal alloy, plastic, or the like.

As shown in FIG. 2, the drive assembly 200 may accommodate at least one hard drive carrier 210 to be in contact with at least one guide rail 235. Guide rails 235 may be affixed to the drive assembly 200, specifically to an interior side surface 208, 209 of the drive bay 205, through any conventional fastening means such as via screws, bolts, or the like. Guide rails 235 can be constructed in a variety of different ways, depending in part on the construction of the drive carriers 210 used with the drive bay 205. The guide rails 235 may abut from the interior side surface 208, 209 of the drive assembly 200 to provide grooves to mate with any suitable device, such as carrier rails (not shown) of the drive carrier 210, as the device is inserted into the IHS chassis, drive assembly 200 or drive bay 205. In other implementations, guide rails 235 may be channels integrally formed from an interior side surface 208, 209 of drive bay 205. Each guide rail 235 may have a front portion that is wider than the majority of the guide rail 235, thereby facilitating insertion of a hard drive carrier 210. Each guide rail 235 may also include an interior portion providing support for the inserted carriers. Consequently, the guide rail 235 may have a substantially U-shaped cross section. Those of ordinary skill in the art will readily recognize that a variety of different guide rail designs can be used including rails, grooves formed by pairs of rails or lances, slots, or the like.

Moreover, guide rails 235 may be located in rows on an interior side surface 208, 209 of the drive bay 205 and/or at a particular distance from each other so that the drive bay 205 is optimized to contain the maximum number of drive carriers 210 allowed. As shown, the drive bays 205 may each accommodate approximately 4 drive carriers 210 separated by guide rails 235. It is understood, however, that any suitable number of drive carriers 210 may be inserted into an IHS chassis depending on the size of the drive bays 205.

In some implementations, the distance between interior side surfaces 208, 209 may be set equal to the average size of a conventional drive carrier 210 or disk drive to be accommodated by the drive bay 205. In still other implementations, the distance between interior side surfaces 208, 209 may be set to the largest size of a conventional drive carrier 210 or disk drive to be accommodated by the drive bay 205. Although not shown, a storage device (e.g., hard disk drive or HDD) may be inserted within the hard drive carrier 210. The hard drive carrier is adapted to receive any type of hard drive including, but not limited to, a fiber channel disk drive or a Small Computer System Interface (SCSI) disk drive.

Within each drive bay 205, an extruded portion 230 of an interior side surface 208 of the drive bay 205 may serve as a cam surface between the drive bay 205 and hard drive carrier 210. The extruded portion 230 may provide improved strength to withstand the insertion and retention force associated with the hard drive carrier as opposed to bent tabs as used in prior cam surfaces. In one implementation, the extruded portion 230 extends from one interior side surface 208 and away from a second interior side surface 209 within a drive bay 205. In other words, rather than protruding towards the interior of a drive bay 205 where a hard drive carrier 210 may reside, an extruded portion 230 protrudes away from the interior of the drive bay 205. Further, the extruded portion 230 surrounds an opening through which a locking end of a drive carrier lever arm 220 may be inserted to lock the drive carrier 210 into position within the drive bay 205 (to be discussed in more detail below). As shown, an actuating member 215, when compressed, may release the drive carrier lever arm 220 from a locked position.

It is understood that several components of the drive assembly 200 may be moved to a locked or unlocked position. For example, the drive carrier lever arm 220, peripheral device carrier (e.g., hard drive carrier), peripheral device (e.g., hard drive) or the like, may be in the locked position to enable the peripheral device carrier to be secured with in the peripheral device bay or the peripheral device to be secured in the peripheral device carrier. Alternatively, the drive carrier lever arm, peripheral device carrier (e.g., hard drive carrier), peripheral device (e.g., hard drive) or the like, may be in the unlocked position enable the peripheral device carrier to be released from the peripheral device bay or the peripheral device to be released from the peripheral device carrier.

The drive bay 205, as one example of a peripheral device bay, and the hard drive carrier 210 shown in FIG. 2 are only examples and are illustrative of one implementation of a drive assembly 200. The physical dimensions and proportions of the hard drive carrier 210 and the drive bay 205 are not limited to those shown in FIG. 2. Generally, peripheral device bays may include a variety of mounting features, such as brackets and tabs, to allow the device bay to be fastened to an IHS chassis or housing. Alternatively, the drive bay 205 may be integrally formed within the IHS chassis, thus obviating the need for such mounting features.

Figure 3A:
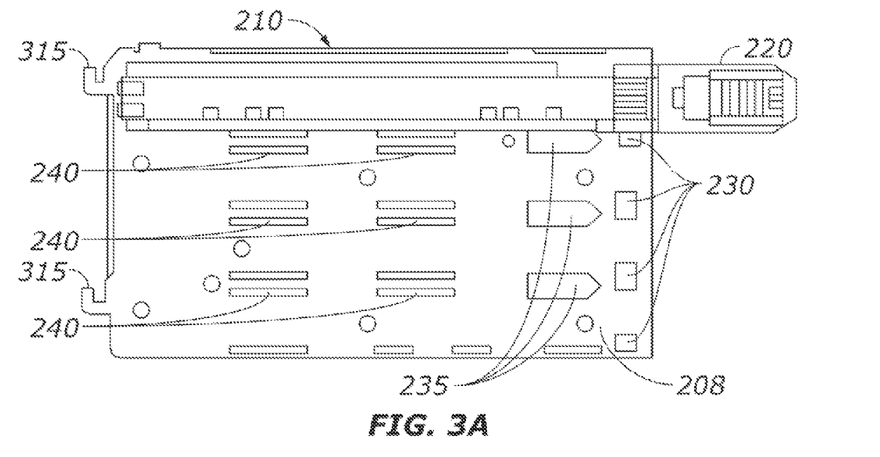
FIGS. 3A & 3B provide alternative views of a hard drive carrier capable of being inserted into a drive bay in accordance with aspects of the present disclosure.
Figure 3B:
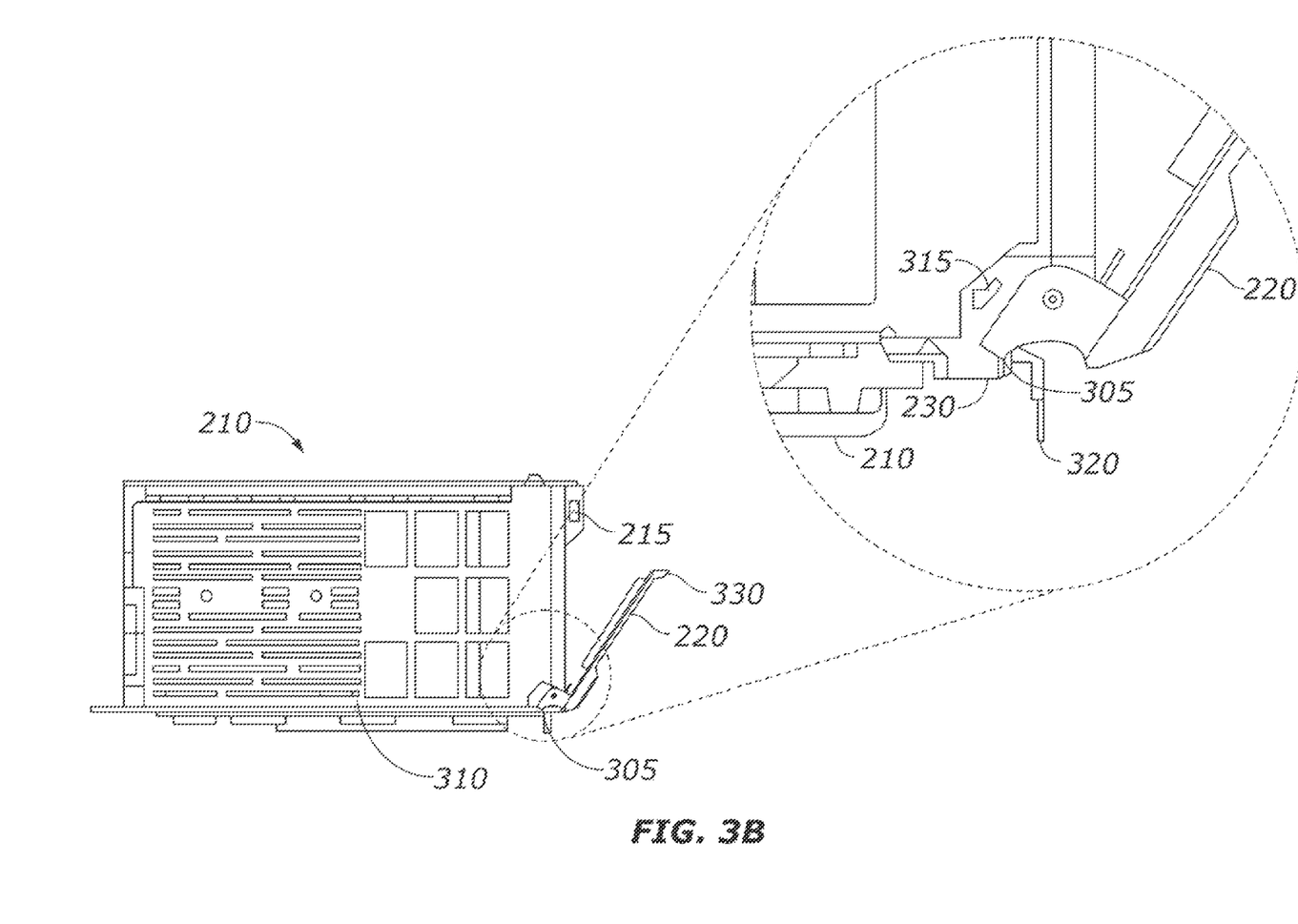

Referring now to FIGS. 3A and 3B, alternative views are provided of a hard drive carrier 210 capable of being inserted into or extracted from a drive bay 205, in accordance with aspects of the present disclosure. Specifically in FIG. 3A, a hard drive carrier 210 is depicted coupled to an interior side surface 208 of the drive bay 205. As previously mentioned, an interior side surface 208 of the drive bay 205 may define at least one extruded portion 230 and guide rail 235, 240 to which a hard drive carrier 210 may contact. Further, the interior side surface 208 of the drive bay 205 may define an assembly contact member 315, shaped as a hook or any suitable contacting structure. The hard drive carrier 210 may further comprise a drive carrier lever arm 220 which may be locked to secure a hard drive within the hard drive carrier 210 or released to eject the hard drive from the hard drive carrier 210. The drive carrier lever arm 220 may be rotatably coupled to or rotatable with respect to a front portion of the hard drive carrier 210 by a rotating member (e.g., hinge) to allow easy insertion or extraction of a hard drive. Further, the drive carrier lever arm 220 may be constructed from a variety of suitable materials such as metal, metal alloy, plastic, or the like.

Moving to FIG. 3B, the hard drive carrier 210 comprising a frame 310 upon which a hard drive may reside. One pivot end 305 of the drive carrier lever arm 220 may be pivotally connected to an edge of the extrusion portion 230 of the interior side surface 208 of the drive bay 205. The other end of the drive carrier lever arm 220 may contain a locking member (e.g., latch, tab) 330, which is open in its free or unlocked state. Those having ordinary skill in the art will readily recognize that the locking member 330 can utilize a variety of different features to help secure the hard drive carrier 210 into the drive bay 205 including, for example, a hook or a single flat surface. The locking member 330 may be used to couple the drive carrier lever arm 220 to an actuating member 215 on the hard drive carrier 210. When the locking member 330 is engaged with the actuating member 215, the drive carrier lever arm 220 is considered in a closed position, thus securing a hard drive within the hard drive carrier 210 and/or the hard drive carrier 210 in the drive bay 205. Alternatively, when the locking member 330 is not engaged with the actuating member 215, the drive carrier lever arm 220 is said to be in an open position, thus allowing the ejection of a hard drive from the hard drive carrier 210 and/or the hard drive carrier 210 from the drive bay 205.

When a hard drive carrier 210 is being inserted into the drive bay 205, the drive carrier lever arm 220 is in an open or unlocked position and the carrier 210 is inserted into the bay 205 along the guide rails 235, 240. As the insertion of the hard drive carrier 210 progresses, certain alignment features (e.g., connectors, pins) on the carrier 210 may begin to engage with a printed circuit board (PCB) in contact with the drive bay 205, typically in the rear portion of the bay 205. The drive carrier lever arm 220 may then be rotated toward the carrier 210 and insertion of the hard drive carrier 210 may be completed when the locking member 330 of the drive carrier lever arm 220 engages with the actuating member 215. When the drive carrier lever arm 220 is engaged with the actuating member 215, the locking member 330 is compressed against the hard drive carrier 210 such that the pivot end 305 of the drive carrier lever arm 220 becomes inserted into the hole of the extruded portion 230. This may ensure the retention of the drive carrier lever arm 220 against the hard drive carrier 210 in a locked position. A portion of the pivot end 305 of the drive carrier lever arm 220 may further contact a camming element 315 upon insertion of the pivot end 305 into the hole of the extruded portion 230. In one implementation, the locking member 330 of the drive carrier lever arm 220 may be received by a clip or the like within the actuating member 215, thus creating a snap and/or an audible sound such as a click. Further, as the carrier 210 is secured into the bay 205, any connection between the carrier 210 and/or the device (e.g., hard drive) retained therein and the printed circuit board in contact with the bay 205 may be completed.

To remove the hard drive carrier 210 from drive bay 205, the drive carrier lever arm 220 may be unlocked from the actuating member 215 (i.e., via a clip within) by depressing the actuating member 215 and pulling the lever arm 220 away from the carrier 215. Once the carrier 210 is released from the bay 205 and any connectors on the carrier 210 are disconnected from the PCB in contact with the bay 205, the carrier 210 can be pulled out of the bay 205. When the drive carrier lever arm 220 is not engaged with the actuating member 215, the pivot end 305 is not inserted into the hole of the extruded portion 230, nor is any portion of the pivot end 305 of the drive carrier lever arm 220 in contact with the camming element 315. Those having ordinary skill in the art will readily recognize that a variety of different selectively engageable schemes can be used allowing the drive carrier lever arm 220 to be opened and closed and providing secure retention of the hard drive carrier 210 within the drive bay 205 or the hard drive within the hard drive carrier 210. The drive carrier lever arm 220 may also be made of any suitable compliant or pliable material such that it may accommodate tolerance variations in dimensions of the hard drive carrier 220, drive bay 205, drive assembly 200 or IHS chassis.

Figure 4A:
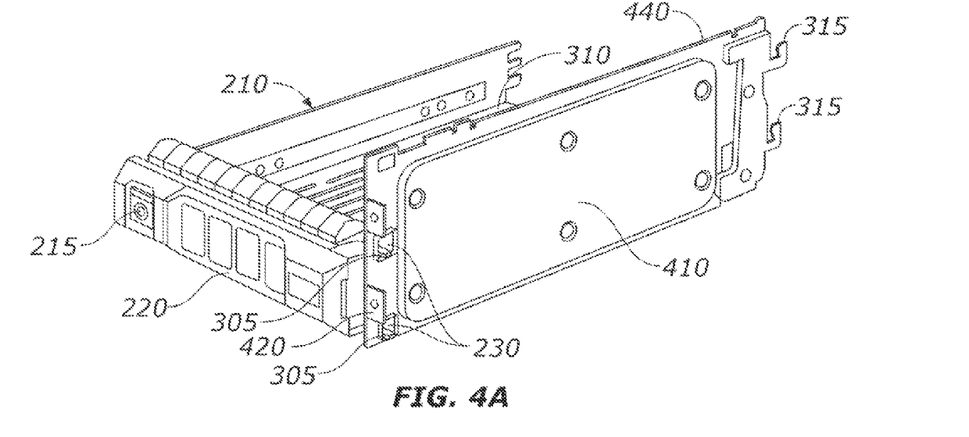
FIGS. 4A & 4B provide alternative views of a hard drive carrier engaged with a portion of a drive bay wall in accordance with aspects of the present disclosure.
Figure 4B:
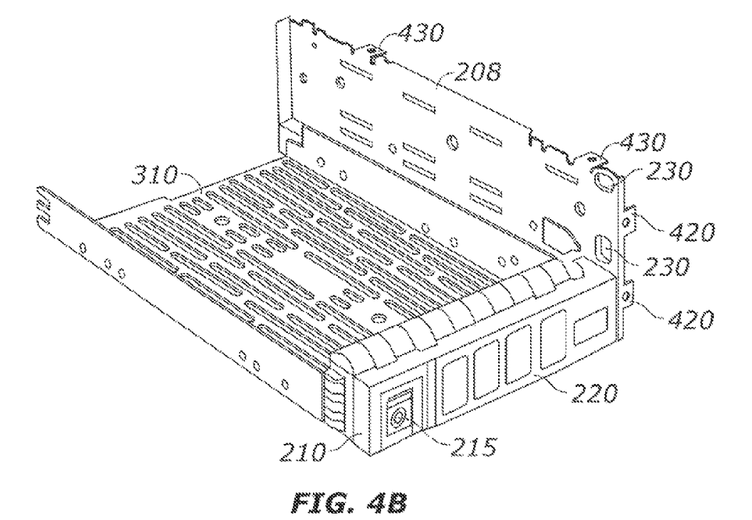

Now moving to FIGS. 4A and 4B, alternative views are provided of a hard drive carrier 210 engaged with a drive bay wall 440 in accordance with aspects of the present disclosure. As previously discussed, the frame 310 of the hard drive carrier 210 is adapted to receive and lock in a hard drive. When the locking member 330 of the drive carrier lever arm 220 is engaged with an actuating member 215 on the hard drive carrier 210, the hard drive carrier 210 is depicted as in a locked or engaged position. As such, the pivot ends 305 of the drive carrier lever arm 220 may be securely inserted within the hole of the extruded portion 230 of the interior side surface 208 of the drive bay 205. In the present view, the extruded portion 230 of the interior side surface 208 may be seen proximate and within approximately 2.2 mm of the drive bay wall mounting flange 420. Further, edges of the extruded portion 230 are shown protruding away from the interior side surface 208 toward the exterior side surface 410 of the drive bay wall 440.

For the drive carrier lever arm 220 to engage properly with the extruded portion 230 (i.e., cam surface) on the drive bay wall, the cam surface must be relatively close to the front surface of the IHS chassis. In a typical IHS chassis, the extruded portion may be constructed within 2.2 mm of the drive bay wall mounting flange 420. As used herein, "camming" or any form of "cam" may refer to the process of contacting or mating two different surfaces so as to allow the reinforcement of one of the surfaces upon the other surface. For example, a fastening member may be pivoted to provide a camming surface between a drive carrier and drive bay.

Figure 5A:
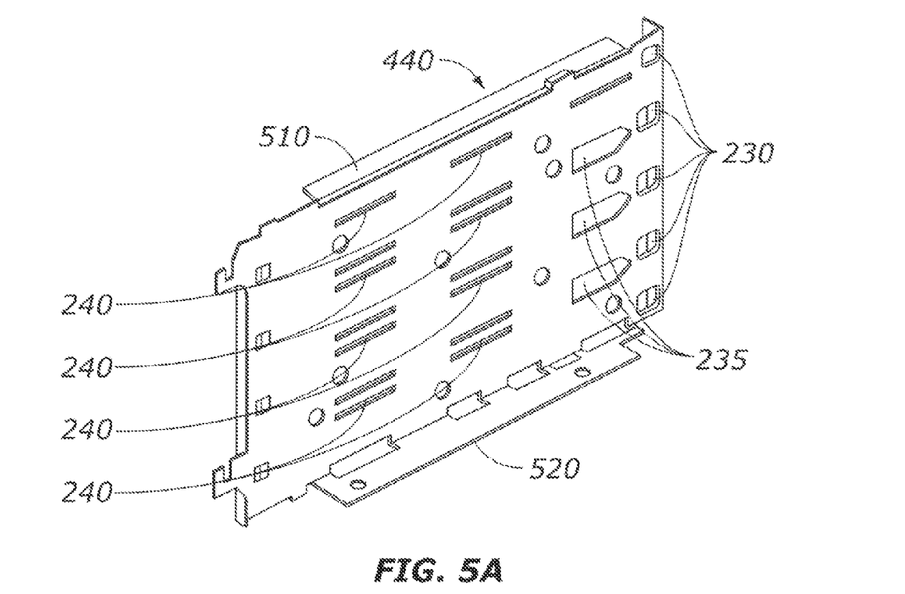
FIGS. 5A & 5B provide alternative views of a portion of a drive bay wall in accordance with aspects of the present disclosure.
Figure 5B:
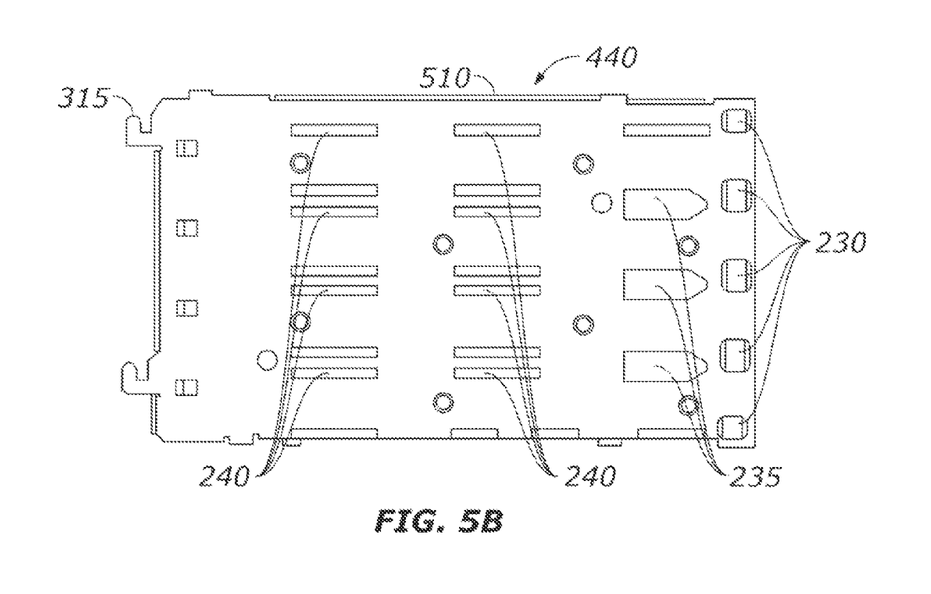

Referring now to FIGS. 5A & 5B, alternative views are provided of a drive bay wall 440, in accordance with aspects of the present disclosure. When disposed within a drive assembly, contact surfaces 510, 520 and assembly contact member 315 provide points of contact between the drive bay wall 440 and drive assembly. As in the aforementioned, rail guides 235, 240 provide points of contact between the drive bay wall 440 and a hard drive carrier. Further, at least one extruded portion 230, proximate the drive bay wall mounting flange 420, may receive a pivot end 305 of a drive carrier lever arm 220 when engaging a hard drive carrier within the drive bay.

Figure 6:
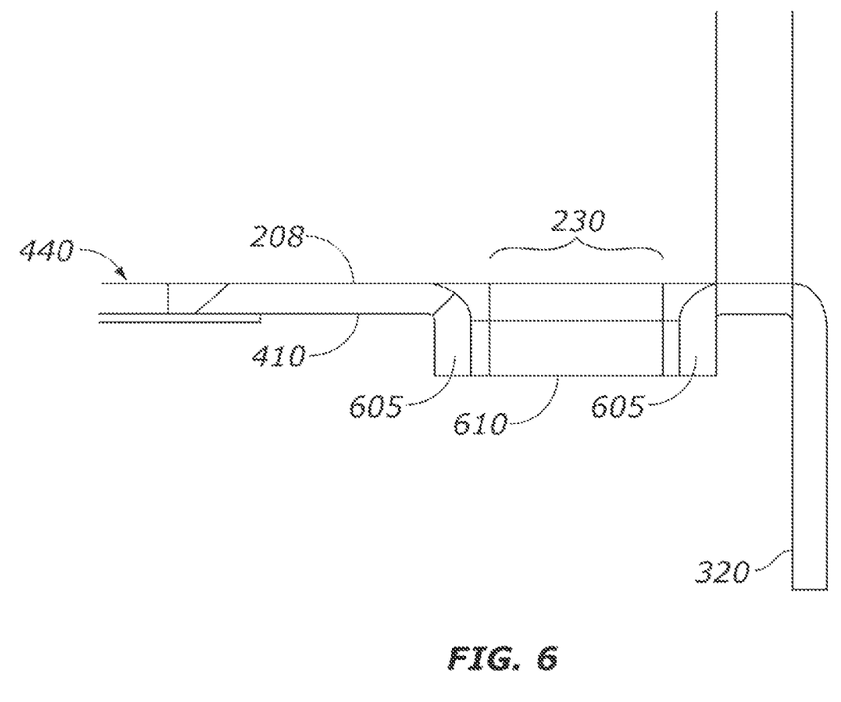
FIG. 6 provides a magnified cross-sectional view of the portion of drive bay wall of FIGS. 5A and 5B.

Turning to FIG. 6, a magnified cross-sectional view is provided of a drive bay wall 440. Proximate to the drive bay wall mounting flange 420 is an extruded portion 230 with edges 605 surrounding a hole 610 through which a pivot end 305 of a drive carrier lever arm 220 can be inserted and secured. Depicted clearly are the edges 605 of the extruded portion 230, which protrude toward the exterior side surface 410 and away from the interior side surface 208 of the drive bay wall 440.

Storage device (e.g., hard drive or HDD) carrying apparatus and systems of the present disclosure exhibit enhanced strength and compactness and thus, provide higher drive densities in storage devices. Specifically, the extruded portions of the drive bay wall may provide improved strength to withstand the insertion and retention force requirements of the hard drive carrier as opposed to bent tabs as used in prior cam surfaces. Further, the extruded portions provide a cam surface with a tightly controlled tolerance in a very limited space between the drive bay and hard drive carrier.

One implementation of a drive assembly for use in the present disclosure is suitable to receive standardized 3.5" or 2.5" hard drive carrier that incorporates features including, but not limited to, low cost, small form factor, hot-swappable, applicability in both storage and server products, or the like.

Although the examples shown in FIGS. 1-6 illustrate hard disk drive components, it will be apparent to those of ordinary skill in the art that a variety of different peripheral devices can take advantage of an extruded portion as a camming surface. Any suitable device, such as a blade server or power supply, associated with operation of an IHS or capable of being inserted into an IHS chassis, may also benefit from the apparatus and systems described herein.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A peripheral device assembly comprising:
 a device bay for receiving a peripheral device carrier, wherein an interior side surface of the device bay defines at least one hole formed with an extrusion portion surrounding the hole, the hole being positioned for receiving a first end of a lever arm of the peripheral device carrier when the device carrier is inserted into the device bay, the extrusion portion comprising edges protruding from the surface of the device and surrounding a non-linear portion of the periphery of the hole wherein the edges protruding from the interior side surface of the device bay are directed toward an exterior side surface of the device bay and completely surround the periphery of the hole.

2. The assembly of claim 1, wherein the device bay is capable of being fastened to an information handling system chassis.

3. The assembly of claim 1, wherein the device bay is integrally formed within an information handling system chassis.

4. The assembly of claim 1, wherein the peripheral device carrier is adapted to receive a hard drive selected from a fiber channel disk drive or a Small Computer System Interface (SCSI) disk drive.

5. The assembly of claim 1, wherein the first end of the lever arm of the peripheral device carrier is engaged with the at least one extrusion portion of the device bay when the peripheral device carrier is in a locked position.

6. The assembly of claim 1, wherein the peripheral device carrier further comprises an actuating member engageable with a second end of the lever arm of the hard drive carrier when the peripheral device carrier is in a locked position.

7. The assembly of claim 6, wherein the actuating member is compressable to release the peripheral device carrier from a locked position.

8. A storage device assembly disposed within an information handling system, the assembly comprising:
   a device bay for receiving a storage device carrier, wherein an interior side surface of the device bay defines at least one extrusion portion having edges surrounding portions of the periphery of a hole, the hole being positioned on the device bay for receiving a first end of a lever arm of the hard drive carrier when the carrier is received into the device bay, and the extrusion portion comprising at least two edges which are angularly disposed with respect to each other wherein the device bay is integrally formed within an information handling system chassis and the edges protrude from the interior side surface of the device bay toward an exterior side surface of the device bay and completely surround the periphery of the hole.

9. The assembly of claim 8, wherein the carrier comprises an actuating member engaged with a second end of the lever arm of the hard drive carrier when the hard drive carrier is in a locked position.

10. The assembly of claim 8, wherein the first end of a lever arm of the carrier is engaged with the at least one extrusion portion of the device bay when the carrier is in a locked position.

11. An information handling system comprising:
    a processor;
    a memory communicatively coupled to the processor;
    a chassis supporting the processor and the memory; and
    a device bay, coupled to the chassis, for receiving a peripheral device carrier, wherein an interior side surface of the device bay defines at least one hole for engaging with a first end of a lever arm of the peripheral device carrier when the peripheral device carrier is received in the device bay, the hole being provided with edges protruding from the hole and continuously surrounding at least half the periphery of the hole wherein the peripheral device carrier is adapted to receive a peripheral device and the edges protrude from the interior side surface of the device bay toward an exterior side surface of the device bay and completely surround the periphery of the hole.

12. The system of claim 11, wherein the lever arm is pivotally coupled to the peripheral device carrier via a hinge.

13. The system of claim 11, wherein the peripheral device comprises a hard disk drive.

14. The system of claim 11, wherein the peripheral device comprises a fiber channel disk drive.

15. The system of claim 11, wherein the peripheral device comprises a Small Computer System Interface (SCSI) disk drive.

16. The system of claim 15, wherein the actuating member is further engageable with a second end of the lever arm of the peripheral device carrier when the peripheral device carrier is in a locked position.

17. The system of claim 11, wherein the lever arm comprises an actuating member compressable to release the peripheral device carrier from a locked position.

* * * * *